(12) United States Patent
Pan et al.

(10) Patent No.: US 6,466,601 B1
(45) Date of Patent: Oct. 15, 2002

(54) BEAM SEAL FOR LINE NARROWED PRODUCTION LASER

(75) Inventors: Xiaojiang J. Pan; Vladimir Kulgeyko, both of San Diego, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/834,840

(22) Filed: Apr. 13, 2001

(51) Int. Cl.[7] ................................................. H01S 3/03
(52) U.S. Cl. ............................ 372/61; 372/57; 372/107
(58) Field of Search ............................. 372/55–65, 107, 372/109

(56) References Cited

U.S. PATENT DOCUMENTS

| | | | |
|---|---|---|---|
| 4,575,853 A | * | 3/1986 | Jako ............................. 372/61 |
| 4,596,018 A | * | 6/1986 | Gruber et al. ................. 372/87 |
| 5,502,740 A | * | 3/1996 | Welsch et al. ................. 372/82 |
| 5,991,324 A | * | 11/1999 | Knowles et al. .............. 372/57 |
| 6,018,135 A | * | 1/2000 | Weick .................... 219/121.79 |
| 6,109,574 A | | 8/2000 | Pan et al. ................. 248/176.1 |
| 6,154,470 A | * | 11/2000 | Basting et al. ................ 372/19 |
| 6,327,290 B1 | * | 12/2001 | Govorkov et al. ............ 372/61 |

* cited by examiner

Primary Examiner—Paul Ip
Assistant Examiner—Davienne Monbleau
(74) Attorney, Agent, or Firm—John R. Ross (57) ABSTRACT

A gas discharge modular laser with beam train isolation between laser chamber module and front and rear optics which define the laser resonant cavity. Beam train isolation units isolates the beam train from atmospheric air while permitting quick and easy removal of the laser chamber without disturbing the optics of the resonant cavity. In preferred embodiments, metal bellows units are bolted at only side so that the chamber module can be removed and replaced without unbolting the bellows unit.

6 Claims, 8 Drawing Sheets

BEAM SEAL FOR LINE NARROWED PRODUCTION LASER

BACKGROUND OF THE INVENTION

Ultraviolet lasers are widely used in industry. Important examples are current use of KrF and ArF excimer lasers (and the currently scheduled use of $F_2$ excimer lasers) for lithographic fabrication of integrated circuits. These lasers typically operate 24 hours a day, 7 days per week 365 days per year with only short down times for maintenance.

Ultraviolet light generated in these lasers can damage sensitive optical components in the presence of oxygen or a wide variety of other chemicals or chemical compounds. Also, oxygen is significantly absorptive of the ArF laser beam and very absorptive of the $F_2$ laser beam. For these reasons, a common practice is to purge sensitive optical components of these lasers with nitrogen or helium. Another known practice for reducing optical damage is to minimize the use of components or materials which out-gas chemical vapors during laser operation.

A well used technique used in the construction of these lasers is to group components into modules which can be quickly and easily replaced as a part of a maintenance program.

The path of the laser beam through a laser system is referred to as a "beam train". Attempts have been made to seal the beam trains from the outside environment. These attempts especially attempts to seal the sections of the beam train in between modules, have often made module replacement much more difficult. Also, seals between modules may permit unwanted vibration produced in one module to be transferred to another module where the vibration adversely affects performance. This is an especially serious concern for the modules containing the optical components which form the resonant cavity of the laser and the component (sometimes called a "wavemeter") that measures beam parameters such as wavelength and bandwidth.

Figure 1:
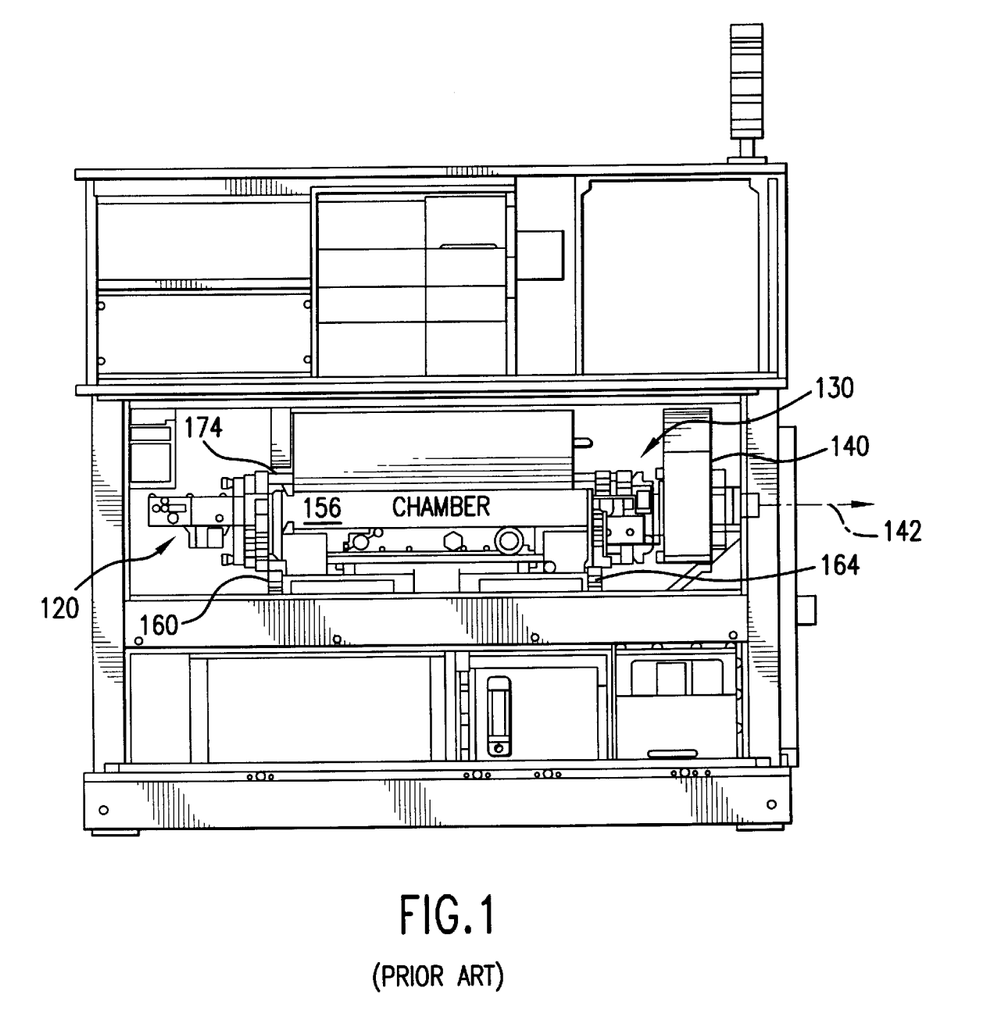
FIG. 1 shows a modular prior art laser system.

FIG. 1 is a drawing of a prior art KrF laser system with the front doors of the laser cabinet removed. The drawing shows chamber 156, line narrowing module 120 output coupler module 130 and wavemeter 140. The direction of the output laser beam is shown at 142. Chamber 156 weighs about 200 pounds but is fitted with wheels and can be replaced quickly and easily by disconnecting two gas lines and rolling the old chamber out and rolling a new chamber in on rails as shown in FIGS. 8, 8A, 9 and 9B. In this prior art KrF laser, the portions of the beam train between the chamber and the output coupler end and between the chamber and the LNP are not sealed so problems associated with transmittal of vibration through seals and seal interference with chamber removal does not exist.

What is needed is an effective method for protecting the portion of the beam train between a laser chamber and optical equipment forming the resonant cavity of the laser while permitting easy replacement of the laser chamber.

SUMMARY OF THE INVENTION

The present invention provides beam train isolation between a gas discharge laser chamber of a modular laser system and front and rear optics defining the laser resonant cavity while permitting quick and easy removal of the laser chamber without disturbing the optics of the resonant cavity. In preferred embodiments, metal bellows units are bolted at only one side so that the chamber can be removed and replaced without unbolting the bellows unit.

DETAILED DESCRIPTION OF THE PREFERRED EMBODIMENTS

First Preferred Embodiment

A first embodiment of the present invention is shown in FIGS. 2, 3, 4 and 5A, B and C. In this embodiment a special beam sealing bellows unit is used on both the LNP side of the chamber and the output coupler side of the chamber. These seal units:

1) contain no elastomers
2) provide vibration isolation for the LNP and the OC from chamber vibration
3) provide beam train isolation from atmospheric gases
4) permit unrestricted replacement of the chamber without disturbance of the LNP and the output coupler.

Figure 2:
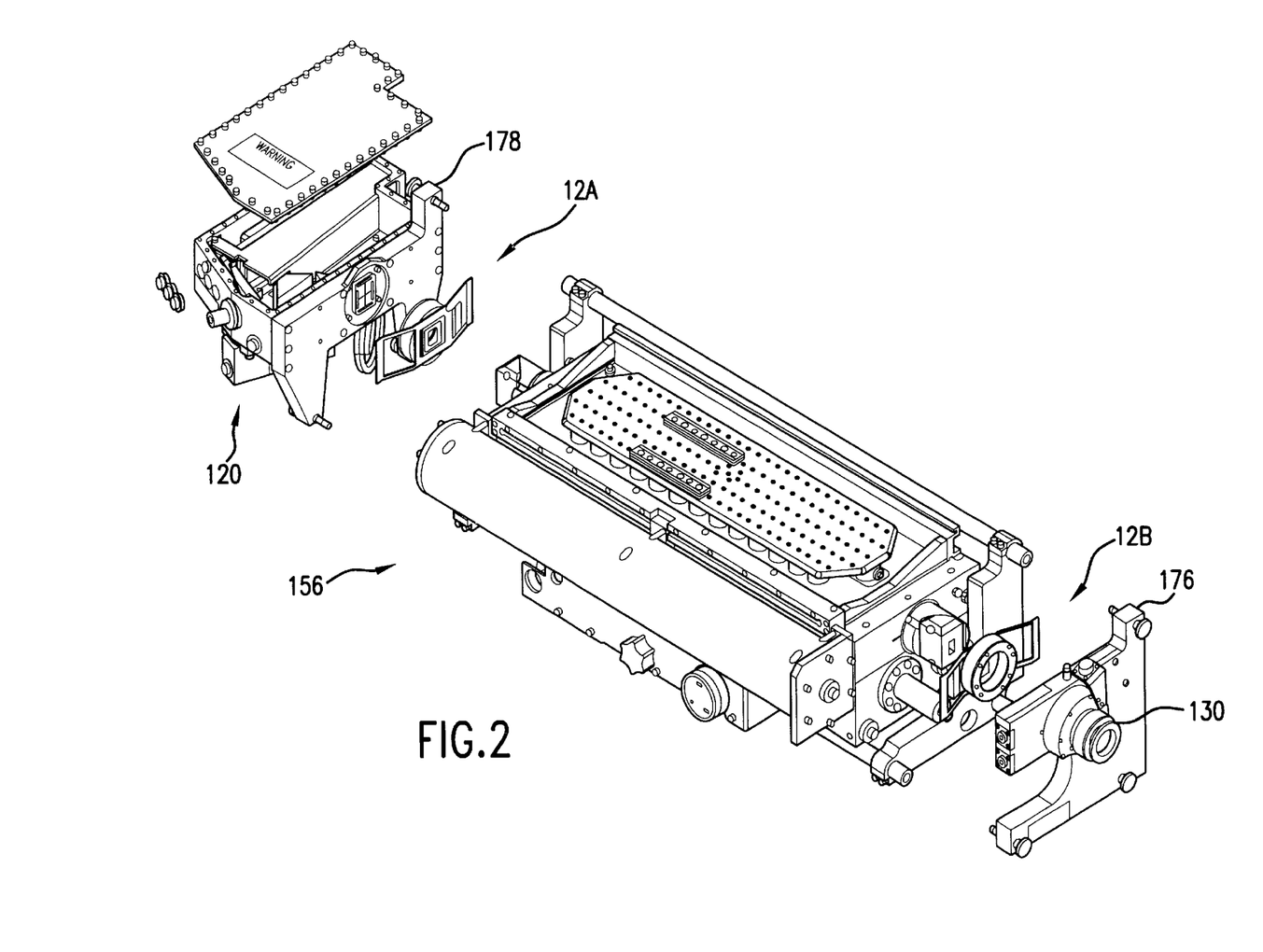
FIG. 2 is an exploded view showing features of a first embodiment present invention.
Figure 3:
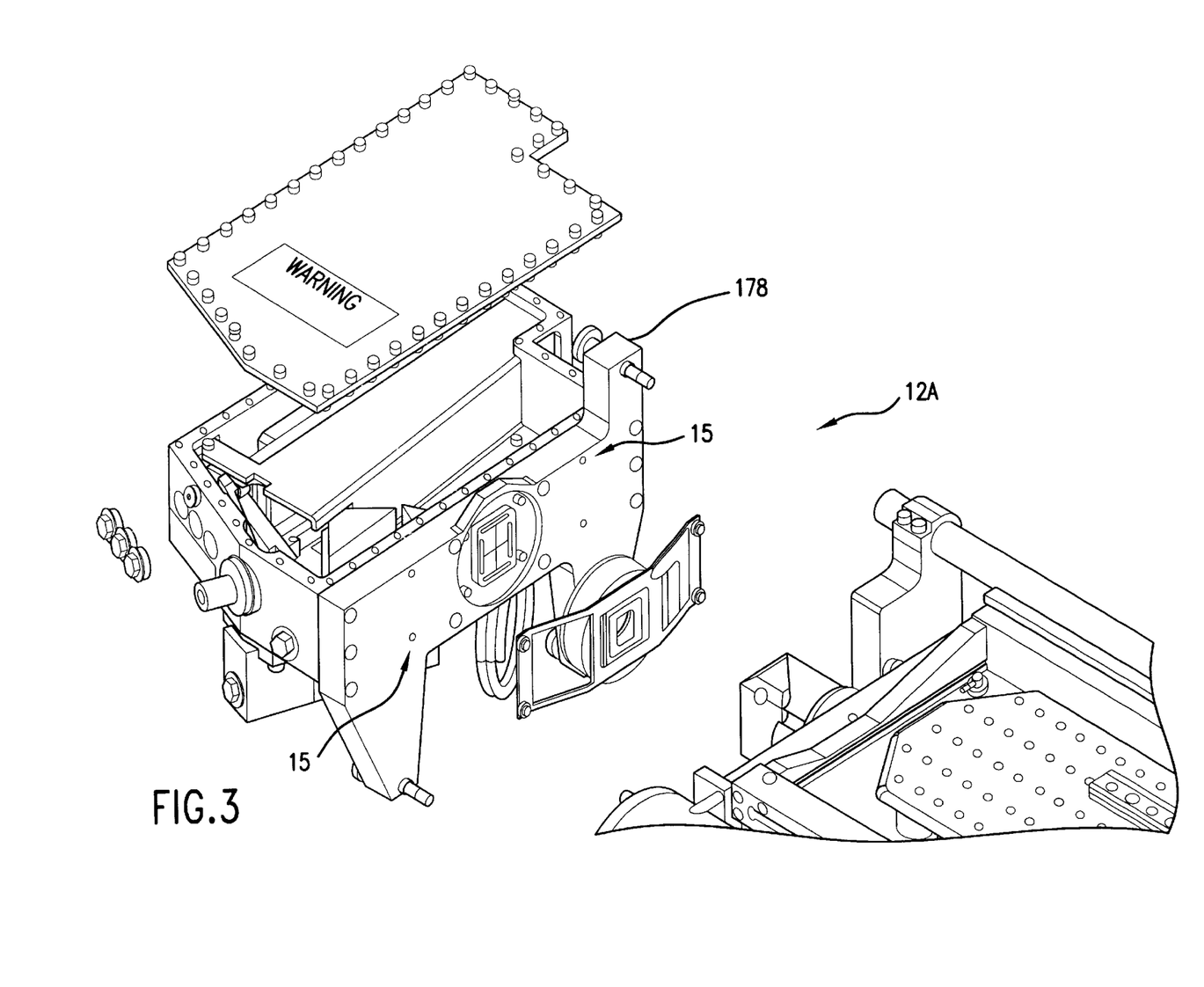
FIG. 3 is an enlarged view of a portion of FIG. 2.
Figure 4:
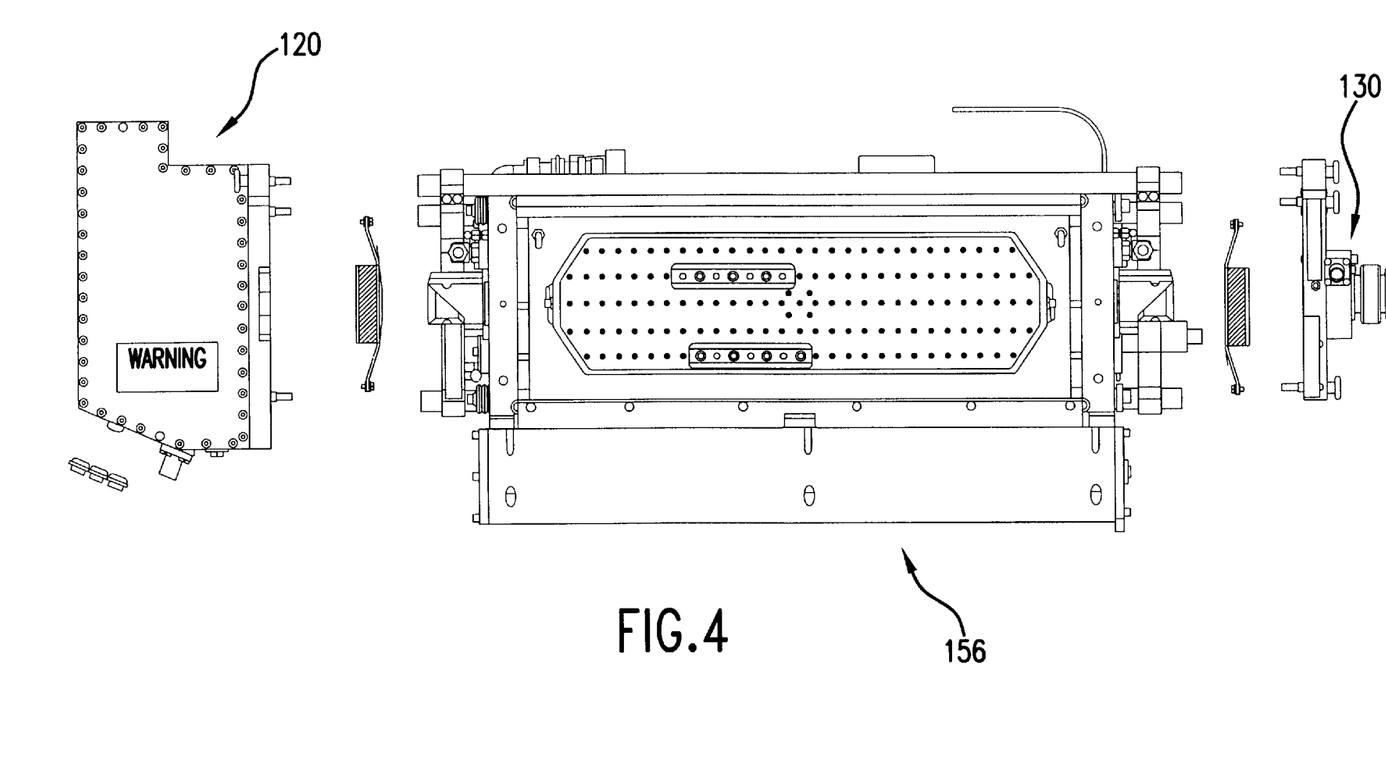
FIG. 4 is a top view of the FIG. 2 embodiment.

An exploded perspective view of the LNP, chamber and output coupler portions of an ArF laser system demonstrating this preferred embodiment is shown in FIG. 2. A bellows system between the LNP and the back chamber window unit is shown at 12A and an identical bellows system between the output coupler and the front chamber window unit is shown at 12B. An enlarged exploded view of the LNP-chamber interface is shown in FIG. 3 and a top exploded view is shown in FIG. 4.

As has been done in prior art designs, the LNP 120 and the output coupler 130 are rigidly connected together using a structure called a three-bar mount and this structure is kinematically mounted on the laser frame separate from the chamber 156 using a bearing system which avoids any potential distortion of the structure. The three-bar mount comprises output coupler support frame 176 and LNP support frame 178 which are connected to each other with three cross braces 174, each of which are comprised of bars having almost zero coefficient of thermal expansion all as described in U.S. Pat. No. 6,109,574 which is incorporated herein by reference. It is important that the optical components of the LNP and the output coupler be isolated as much as feasible from the laser chamber because the chamber is subject to relatively wide swings in temperature during normal operation. Also, the chamber fan and fan motor generate substantial vibrations. Vibrations are also generated in the chamber by electric discharges which occur at rates in the range of 1000 hz to 4000 hz.

Bellows Details

Figure 5A:
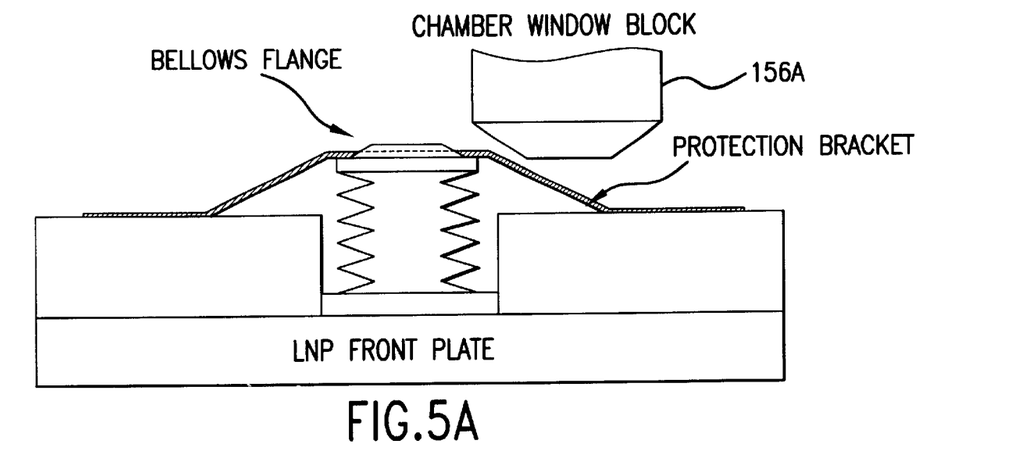
FIGS. 5A, B and C show how the present invention works.
Figure 5B:
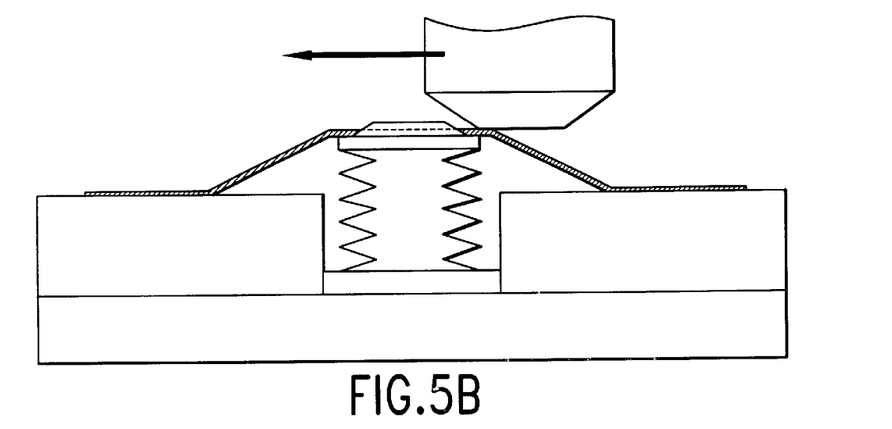
Figure 5C:
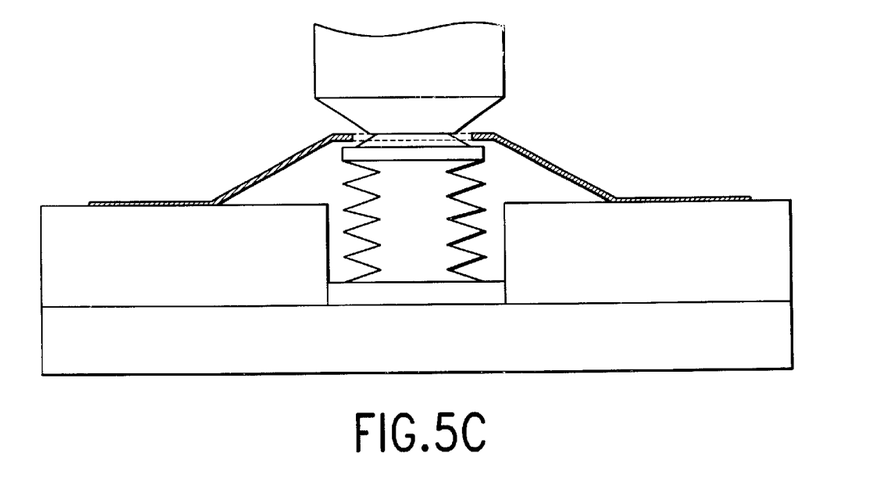

The bellows systems shown at 12A and 12B are identical. FIGS. 5A, 5B and 5C show the basic details of both bellows design using the LNP bellows as an example. These figures also show how the chamber is installed without any assembly or disassembly of the two bellows systems. The principal components of each bellows system are a bellows unit 13 and flexible alignment bracket 14. The bellows unit 13 comprises a flexible metal bellows 13A with accordion-like cylindrically-shaped walls, back base plate 13B and front base plate 13C. Back base plate 13B is bolted to the front plate 178 of the LNP. Both surfaces of back base plate 13B and the mating surface of LNP front plate 178 are very smooth and flat so that when bolted together they form a very tight fit. Alignment bracket 14 comprises four springy metal legs which springingly deform when force is applied. The bracket is attached to the LNP frame with four small bolts at the locations shown at 15 on FIG. 3. The corresponding bolt slots in bracket 14 are oval shaped and the bolts are designed to permit alignment bracket to spread out when a force is applied to it in the direction of the LNP. FIGS. 5A, 5B and 5C show three views of the LNP bellows system as a chamber 156 is being installed in laser cabinet. In FIG. 5A a chamber 156 having chamber window block 156A is being rolled into position and in this view is about one inch from its final installed position. In FIG. 5B the chamber has been rolled in closer and begins compressing flexible alignment bracket 14 which in turn compresses bellows unit 13. In FIG. 5C the chamber is fully installed and both bellows units and alignment bracket 14 are compressed into their normal operational position. In this configuration, bellows unit 13 is not in contact with alignment bracket 14 so that all of the compression force generation by the deformation of bellows unit 13 is applied between chamber window block 156A and LNP front plate 178A. In this preferred embodiment, this compressive force is about one to two pounds which effectively isolates the beam train at this location from atmospheric air. However, Applicants have shown that this force could be reduced substantially down to about 0.1 pound without significantly reducing the quality of the seal. The reader should note that a tighter seal can be provided by using a bellows having a larger compressive force applied at this junction. However, a greater force applied in this manner would increase the vibrational coupling between the chamber and the LNP. Applicants have determined that forces in the range of 1 to 2 pounds force is a reasonable compromise. Another consideration in the design of this beam isolation unit is that very low force bellows are difficult to fabricate and tend to be very expensive. Also, these bellows are more subject to damage during use and handling.

As indicated above, the bellows system between the chamber and the output coupler is substantially identical to the one described above so that the chamber can be moved into and out of position without the necessity of manually connecting or disconnecting any beam train isolation components.

Preferably, both the LNP and the output coupler are purged at least during laser operation with $N_2$ or another appropriate purge gas at a flow rate such that the LNP and the output coupler are pressurized very slightly above atmospheric pressure. Applicants' test have shown that with the above configuration the oxygen content inside the LNP and output coupler is reduced to less than 100 parts per million.

The reader should also note that this design does not include any elastomer seals so that out-gassing from such seals is not a problem.

Second Preferred Embodiment

Figure 6A:
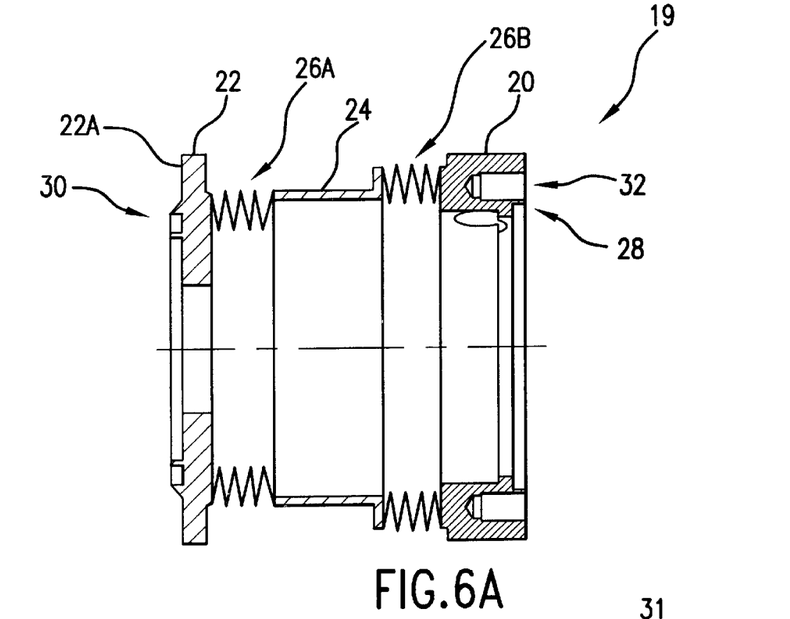
FIGS. 6A, 6B, 6C and 7 show features of a second embodiment of the present invention.
Figure 6B:
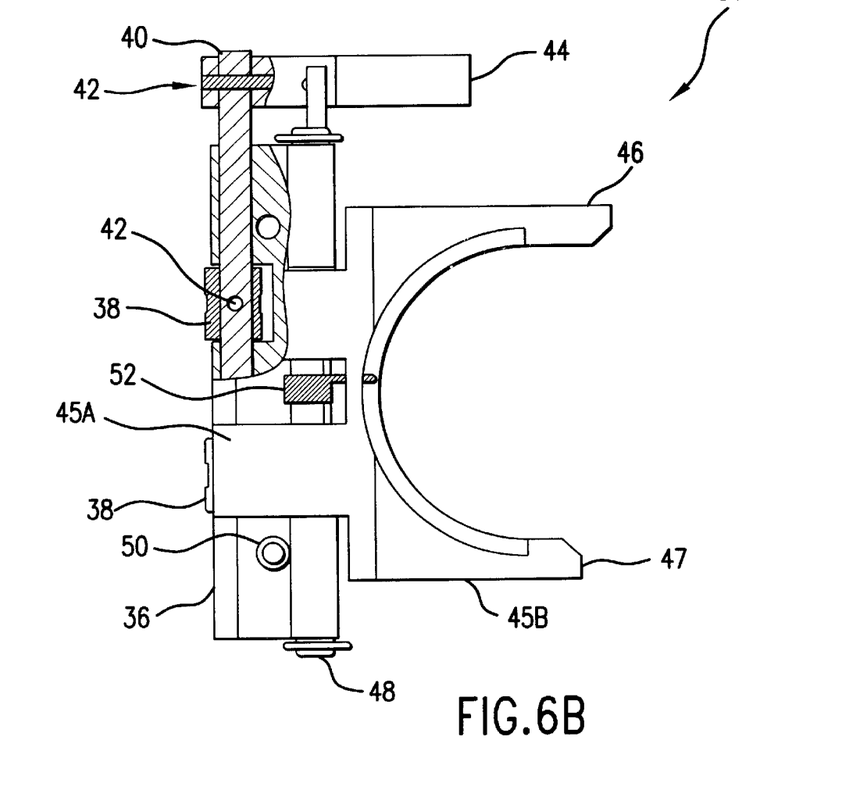
Figure 7:
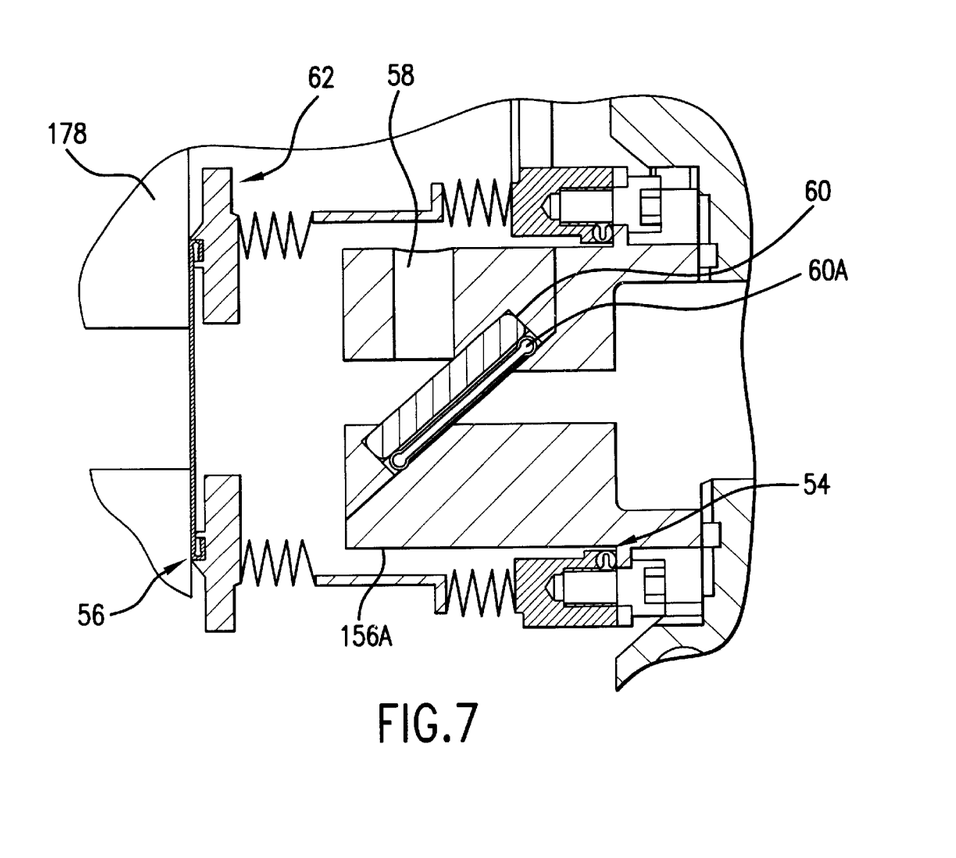
Figures 8, 8A:
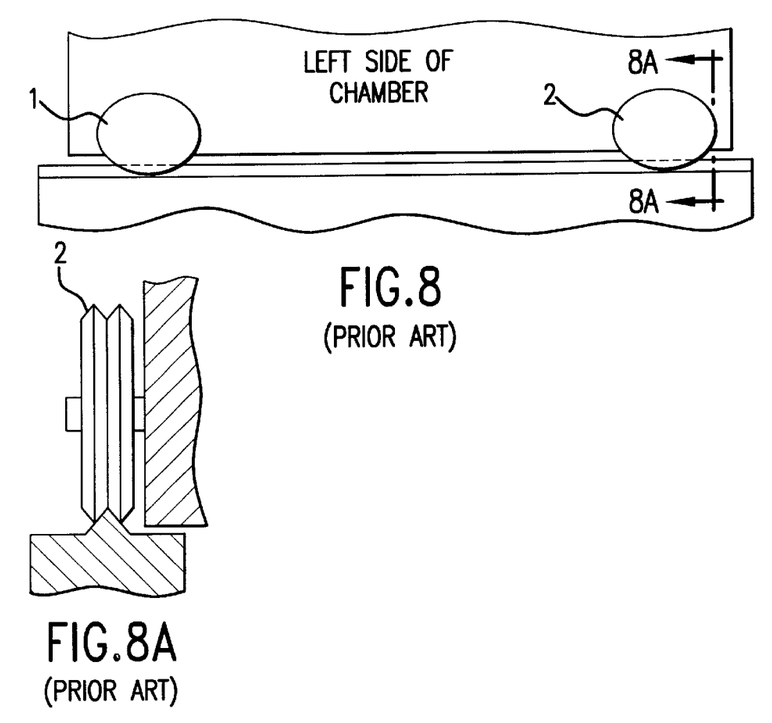
FIGS. 8, 8A, 9 and 9A show how a chamber rolls into position.
Figures 9, 9A:
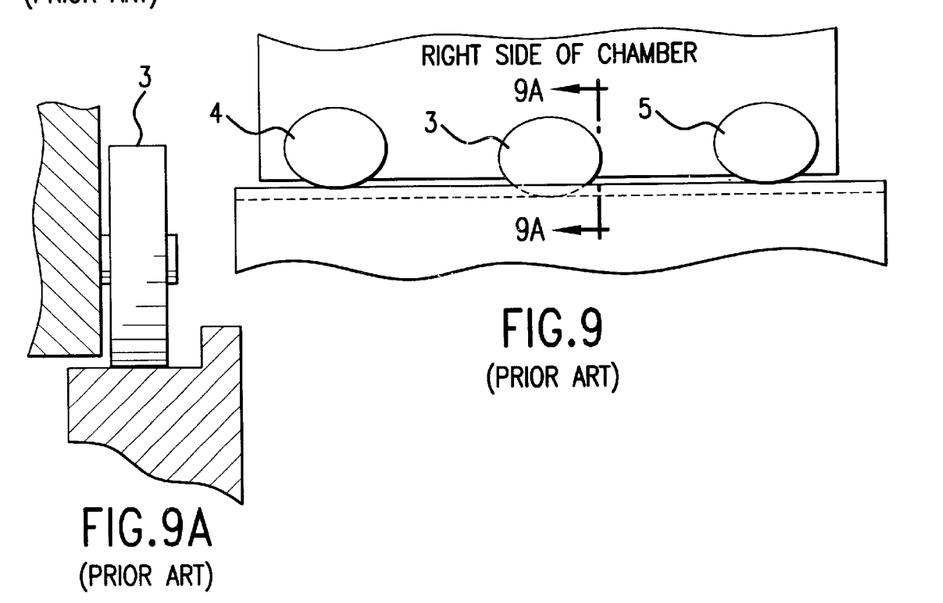

A second preferred embodiment of the present invention is shown in FIGS. 6A, 6B and 7.

FIG. 6A is a cross sectional drawing showing important features of this second preferred embodiment. This embodiment provides a substantially tighter seal at both the LNP and the output coupler sides of the chamber but also provides ease of chamber replacement minimal vibration transfer with no elastomer seals.

The bellows structure 19 is a flexible unit comprised of a chamber window block mounting flange 20 a clampable flange 22, a rigid cylinder 24 machined from 304SST and two accordion-type bellows assemblies 26A and 26B made from Perkin Elmer Fluid Sciences AM 350 bellows material. The chamber window unit includes two metal c-seals which fit at locations 28 and 30 as shown in FIG. 6A to seal purge gas from contamination. Flange 20 attaches to the window assembly by four 10×32 cap screws at location 32 in FIG. 6A. Flange 22 attaches to LNP frame 178 using a V-clamp unit 31 shown in FIG. 6B which is seal mounted on the LNP frame 178. V-clamp mechanism 31 is a mechanical device which captures clampable flange 22 when the chamber is rolled into place. The components of the v-clamp includes a bracket 36 which is machined from solid AL 6061. Two cams 38 made from free cutting brass (C36000) located on precision ground (303 stainless steel) cam shaft 40 and fixed to position by dowel pins 42. Activation handle 44 made from AL 6061 is located on cam shaft 40 and fixed in position by dowel pin 42. This handle activates yoke-like lever 46 which is attached to shaft 48 which is made from 303 stainless steel and pivots about the axis of shaft 48.

The V-clamp works as follows. The V-clamp shown in FIG. 6 is mounted on LNP frame 178 with bolts at 50. Torsion spring 52 holds the front edge 47 of yoke-like lever 46 about 1 cm off the surface of LNP frame 178 (not shown). As chamber 156 is rolled into position, clampable flange 22 passes very close to the surface of LNP frame 178 until the outer edge 22A of clampable flange 22 is positioned between yoke-like lever 46 and the surface of LNP frame 178.

Figure 6C:
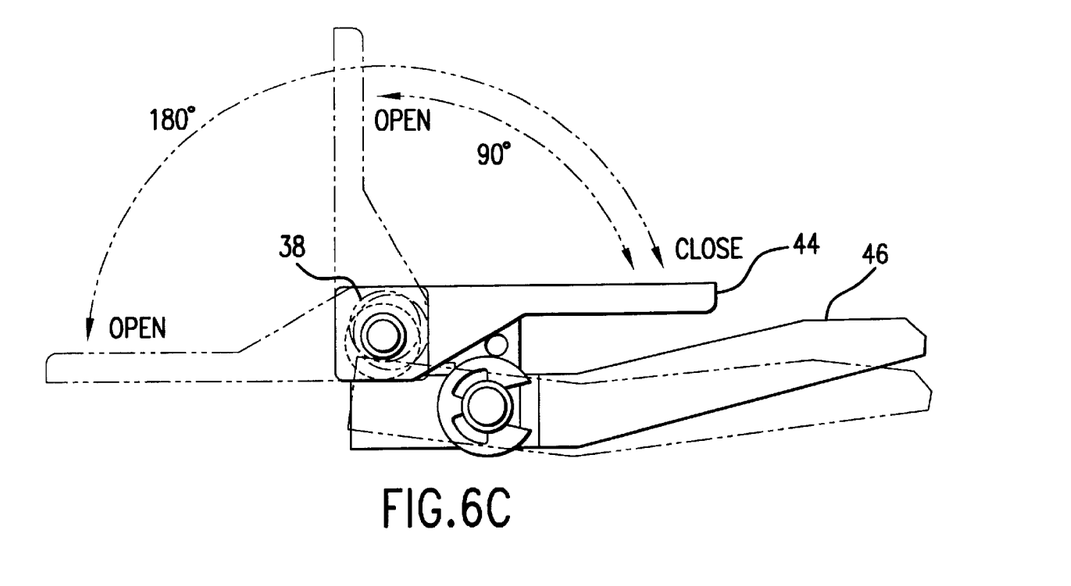

When chamber 156 is in its proper position between LNP 120 and output coupler 130, clampable flange 22 is clamped into position by rotating activation handle 44 90° to 180° (into the page in the FIG. 6B drawing). Cams 38 being offset from the axis of shaft 40 applies a force out of the page (in the FIG. 6B drawing) against the underside of extensions 45 of yoke-like lever 46 which forces the 45B portion of lever 46 downward clamping clampable flange 22 into position. A metal c-seal in slot 30 is compressed by the clamping force providing an air-tight seal between the bellows structure 19 and LNP frame 178. FIG. 6C shows the operation of the V-clamp unit.

FIG. 7 shows the bellows unit in place sealing the chamber-LNP interface. This is a cross-sectional top view. Shown on the drawing are metal c-seals at 54 and 56, chamber window block 156A, purge vent hole 58, chamber window 60 with seal 60A. Arrow 62 shows where the outer edge 22A of clampable flange 22 is clamped against LNP frame 178 by yoke-like lever 46.

A similar bellows structure is utilized at the interface of the chamber 156 and output coupler 130. When the chamber is to be removed, actuation handles are pivoted 90° to 180° in the direction opposite the clamping direction and this separates the bellows structures from LNP frame 174 and output coupler 164 permitting the chamber to be rolled out for replacement without any disturbance of the resonant cavity optics.

Although this invention has been described in detail with reference to specific preferred embodiment, the reader should understand that many variations of the above embodiments are possible. Therefore the reader should understand that the scope of the invention should be determined by the appended claims and their legal equivalents.

That which is claimed is:

1. A modular gas discharge laser system comprising:
   A) a laser cabinet for housing laser modules,
   B) electrodes and a blower for circulating a laser gas,
   C) a front optics module containing an output coupler,
   D) a rear optics module containing one or more optical components which along with said output coupler defines a resonant cavity for said laser system, said resonant cavity defining a beam train between said front optics and said rear optics and passing through said laser chamber,
   E) a beam train isolation means for:
      1) isolating said beam train from atmospheric air at interfaces between said laser chamber module and said front optics module and between said laser chamber and said rear optics module,
      2) permitting easy removal of said laser chamber without disturbing alignment of optical components in said front optics module and said rear optics module and
      3) minimizing transfer of vibration generated in said chamber module into said front and rear optics;
   wherein said beam isolation means comprises at least two bellows units, each bellows unit comprising a hand releasable clamp, releasable without any tool, for disconnecting each of said bellows units from one of said laser modules.

2. A laser system as in claim 1 wherein said isolation means comprises a first bellows unit comprising a first metal bellows and located between said chamber module and said front optics module and a second bellows unit comprising a second metal bellows and located between said chamber module and said rear optics.

3. A laser system as in claim 2 wherein each of said first and second bellows units comprises a metal seal and a plurality of bolts for making a single bolted sealed connection at a first side of each of said first and second bellows units.

4. A laser system as in claim 3 wherein each of said first and second bellows units also comprises a flexible alignment bracket for aligning said first and second metal bellows to provide a tight fit at a second side of each of said first and second bellows units.

5. A laser system as in claim 3 wherein each of said first and second bellows units comprises a clamp means to clamp said first and second bellows units to provide a tight fit at a second side of each of said first and second bellows unit.

6. A laser system as in claim 1 and further comprising a purge means for purging said front and rear optics.

* * * * *

UNITED STATES PATENT AND TRADEMARK OFFICE
CERTIFICATE OF CORRECTION

PATENT NO.   : 6,466,601 B1
DATED        : October 15, 2002
INVENTOR(S)  : Pan et al.

It is certified that error appears in the above-identified patent and that said Letters Patent is hereby corrected as shown below:

Column 5,
Line 11, after "front optics" add -- module --;
Lines 11 and 23, after "rear optics" add -- modules --.

Column 6,
Line 8, after "rear optics" add -- module --;
Line 24, after "rear optics" add -- modules --.

Signed and Sealed this

Twenty-eighth Day of June, 2005

JON W. DUDAS
*Director of the United States Patent and Trademark Office*